(12) United States Patent
Namiki et al.

(10) Patent No.: US 10,526,452 B2
(45) Date of Patent: Jan. 7, 2020

(54) METHOD FOR PRODUCING CURED PRODUCT OF EPISULFIDE-BASED RESIN

(71) Applicant: Mitsubishi Gas Chemical Company, Inc., Tokyo (JP)

(72) Inventors: Kousuke Namiki, Tokyo (JP); Sawako Fuse, Tokyo (JP); Eiji Koshiishi, Tokyo (JP); Kikuo Furukawa, Tokyo (JP); Hiroshi Horikoshi, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 169 days.

(21) Appl. No.: 15/305,614

(22) PCT Filed: Apr. 20, 2015

(86) PCT No.: PCT/JP2015/061947
§ 371 (c)(1),
(2) Date: Oct. 20, 2016

(87) PCT Pub. No.: WO2015/163269
PCT Pub. Date: Oct. 29, 2015

(65) Prior Publication Data
US 2017/0044323 A1 Feb. 16, 2017

(30) Foreign Application Priority Data
Apr. 23, 2014 (JP) .................. 2014-089174

(51) Int. Cl.
| | |
|---|---|
| C08G 75/08 | (2006.01) |
| B29C 39/02 | (2006.01) |
| B29C 39/24 | (2006.01) |
| B29C 39/38 | (2006.01) |
| G02B 1/04 | (2006.01) |
| G02C 7/00 | (2006.01) |
| B29B 7/88 | (2006.01) |
| B29C 35/04 | (2006.01) |
| B29C 45/00 | (2006.01) |
| B29D 11/00 | (2006.01) |
| B29C 67/24 | (2006.01) |
| B29K 81/00 | (2006.01) |
| B29L 11/00 | (2006.01) |
| G02C 7/02 | (2006.01) |

(52) U.S. Cl.
CPC .............. *C08G 75/08* (2013.01); *B29B 7/88* (2013.01); *B29C 35/041* (2013.01); *B29C 39/02* (2013.01); *B29C 39/24* (2013.01); *B29C 39/38* (2013.01); *B29C 45/0001* (2013.01); *B29C 67/246* (2013.01); *B29D 11/00009* (2013.01); *G02B 1/04* (2013.01); *G02B 1/041* (2013.01); *G02C 7/00* (2013.01); *B29K 2081/00* (2013.01); *B29K 2081/04* (2013.01); *B29L 2011/0016* (2013.01); *C08G 2120/00* (2013.01); *G02C 7/02* (2013.01)

(58) Field of Classification Search
CPC .............................. B29C 35/041; C08G 75/08
See application file for complete search history.

(56) References Cited

U.S. PATENT DOCUMENTS

| | | | | |
|---|---|---|---|---|
| 5,198,305 | A * | 3/1993 | Wada | .................. C08F 8/48 |
| | | | | 428/463 |
| 6,117,923 | A | 9/2000 | Amagai et al. | |
| 6,365,707 | B1 | 4/2002 | Ryu et al. | |
| 2001/0047043 | A1* | 11/2001 | Okoroafor | ............. C08G 75/08 |
| | | | | 522/31 |
| 2010/0256271 | A1* | 10/2010 | Hasegawa | ................ C08K 9/08 |
| | | | | 524/204 |

(Continued)

FOREIGN PATENT DOCUMENTS

| | | |
|---|---|---|
| JP | H03-234512 A | 10/1991 |
| JP | H05-307101 A | 11/1993 |
| JP | H08-208792 A | 8/1996 |

(Continued)

OTHER PUBLICATIONS

CAS document for episulfide compound, no date.*
International Search Report dated Jun. 23, 2015 for PCT/JP2015/061947 and English translation of the same (4 pages).

*Primary Examiner* — Alex A Rolland
(74) *Attorney, Agent, or Firm* — Fitch, Even, Tabin & Flannery LLP

(57) ABSTRACT

The present invention can provide a method for producing a cured product of an episulfide-based resin, the method having: (A) a step for obtaining a composition for a resin by mixing compound (a), compound (b) and a polymerization catalyst; (B) a step for pouring the composition for a resin into a mold; and (C) a step in which, by increasing the temperature of a heating medium, the composition for a resin is polymerized in the heating medium that contains a liquid having a thermal conductivity of 0.2 W/m·K or higher, or in a shower of the heating medium. The maximum temperature of the heating medium in step (C) is 55 to 110° C.

(a) A compound which has two episulfide groups per molecule and which is represented by formula (1):

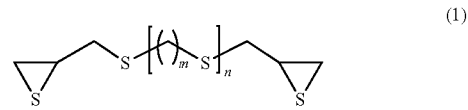

(1)

wherein m represents an integer from 0 to 4 and n represents an integer from 0 to 2

(b) A compound having one or more thiol groups per molecule.

11 Claims, No Drawings

(56) References Cited

U.S. PATENT DOCUMENTS

2012/0309932 A1  12/2012  Takemura et al.
2013/0231425 A1   9/2013  Takemura et al.

FOREIGN PATENT DOCUMENTS

| JP | H10-298287 A | 11/1998 |
| JP | 2001-220444 A | 8/2001 |
| JP | 2004-256655 A | 9/2004 |
| JP | 2009-217215 A | 9/2009 |
| JP | 2011-073165 A | 4/2011 |
| JP | 2014-084440 A | 5/2014 |
| WO | 2009/078129 A1 | 6/2009 |
| WO | 2011/105320 A1 | 9/2011 |
| WO | 2012/066744 A1 | 5/2012 |

\* cited by examiner

METHOD FOR PRODUCING CURED PRODUCT OF EPISULFIDE-BASED RESIN

CROSS-REFERENCE TO RELATED APPLICATIONS

This application is a U.S. national phase application filed under 35 U.S.C. § 371 of International Application PCT/JP2015/061947, filed on Apr. 20, 2015, designating the United States, which claims priority from Japanese Application No. 2014-089174, filed Apr. 23, 2014, which are hereby incorporated herein by reference in their entirety.

FIELD OF THE INVENTION

The present invention relates to a method for producing a cured product of an episulfide-based resin.

BACKGROUND OF THE INVENTION

Plastic materials are lightweight, highly tough and easy to be dyed, and therefore are widely used recently for various types of optical materials, particularly eyeglass lenses. Optical materials are required to have, as properties, low specific gravity, high transparency and low yellowness, and as optical properties, high refractive index and high Abbe number, and high heat resistance, high strength, etc. A high refractive index allows an optical material to be miniaturized, and a high Abbe number reduces the chromatic aberration of an optical material. High strength facilitates secondary processing and is important in terms of safety, etc. As the technique of simultaneously achieving high refractive index and high Abbe number as optical properties and high heat resistance, use of an episulfide compound is well known.

Meanwhile, when producing a cured product of an episulfide compound having a high refractive index and a high Abbe number including eyeglass lenses, a resin composition containing the episulfide compound is injected into each of desired molds, then put into an oven or the like to be polymerized and cured, and released from each mold to obtain the product. This is because, in the case of the resin composition containing the compound, the amount of heat generated by ring-opening polymerization of episulfide groups is very large, and it is required to use a mold in a size which is as small as possible for facilitating control of heat generation. When heat cannot be effectively removed, for example, when the thickness of the thinnest portion of the internal space of the mold is more than about 2 cm, heat generated by polymerization cannot be completely removed and the temperature of the composition sharply increases, and it may cause yellowing of an optical material obtained, and in some cases, it may result in rapid polymerization to cause a decomposition reaction of the composition. Further, even when a small mold is used, for example, in the case where a lens-shaped optical material is thick, striae tend to be easily generated due to convection caused by heat generation at the time of polymerization, and it is difficult to reduce striae to the level that a product obtained can be used as an optical material.

Thus, when using a mold in a size which is as small as possible, it becomes relatively easier to control heat removal, and it is possible to produce a cured product suitable for optical materials including eyeglass lenses, but there are drawbacks: (1) it is required to prepare a required number of molds corresponding to the number of products to be produced; and (2) since it is required to inject the resin composition into each of molds one by one, the production cost is high and productivity is low. Therefore, if a cured product of an episulfide-based resin having a large size and free of yellowing and striae appropriate for optical materials can be produced, by subjecting the cured product to cutting work to make an optical material, the production cost can be significantly reduced. In addition, it is possible to provide a thick optical material such as a convex lens having an unprecedented large size from the cured product of the episulfide-based resin having a large size, and it is very useful. For this reason, it has been desired to develop a method for the production thereof (see Patent Documents 1-4).

PRIOR ART DOCUMENTS

Patent Documents

Patent Document 1: Japanese Laid-Open Patent Publication No. H10-298287
Patent Document 2: Japanese Laid-Open Patent Publication No. 2001-220444
Patent Document 3: International Publication WO2012/66744 pamphlet
Patent Document 4: Japanese Laid-Open Patent Publication No. H08-208792

SUMMARY OF THE INVENTION

The problems to be solved by the present invention are to provide a cured product of an episulfide-based resin having a large size, in which yellowing and striae are suppressed, by polymerizing and curing a resin composition, which comprises: a compound having two episulfide groups per molecule; a compound having at least one thiol group in one molecule; and a polymerization catalyst, and in which a large amount of heat is generated by polymerization and it is difficult to perform heat removal, and to provide, with good mass productivity, a thick lens such as a convex lens, a transparent substrate, a transparent film, a spectacle lens, a lens, a prism, a mirror, a beam splitter, a filter and other optical members, with a desired size and shape, by subjecting the resin-cured product to cutting work.

The present inventors diligently made researches in order to solve the above-described problems, and found that a cured product of an episulfide-based resin having a large size can be produced without yellowing and rapid polymerization according to the present invention described below. Further, the present inventors found that an optical member having a desired size and shape can be produced by subjecting the obtained cured product of the episulfide-based resin to cutting work. Thus the above-described problems were solved.

Specifically, the present invention is as follows:
<1> A method for producing a cured product of an episulfide-based resin, the method sequentially having:
(A) a step of obtaining a resin composition by mixing a compound (a) below, a compound (b) below and a polymerization catalyst:
(a) a compound having two episulfide groups per molecule represented by formula (1) below:

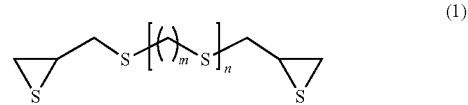

(1)

(b) a compound having at least one thiol group in one molecule;
(B) a step of injecting the resin composition into a mold; and
(C) a step of polymerizing the resin composition in a heating medium, which comprises a liquid having a thermal conductivity of 0.2 W/m·K or higher, or in a shower of the heating medium, with the temperature of the heating medium being elevated, wherein the maximum temperature of the heating medium in the step (C) is 55 to 110° C.
<2> The method according to item <1>, wherein the heating medium has a thermal conductivity of 0.5 W/m·K or higher.
<3> The method according to item <1> or <2>, wherein the heating medium has a boiling point of 60° C. to 120° C.
<4> The method according to item <3>, wherein the heating medium has a boiling point of 95° C. to 120° C.
<5> The method according to item <4>, wherein the heating medium is water.
<6> The method according to any one of items <1> to <5>, wherein the size of the cured product of the episulfide-based resin is such that the thickness is at least 1 cm, that the volume is 50 cm³ or more, and that a cuboid of 1 cm×5 cm×5 cm or 3 cm×3 cm×10 cm is included in the cured product.
<7> The method according to any one of items <1> to <6>, which has, between the step (B) and the step (C), a step (D) of polymerizing the resin composition in the heating medium or in a shower of the heating medium with the temperature of the heating medium being kept at 0 to 55° C.
<8> The method according to item <7>, wherein 10 to 90% of the compound represented by formula (1) is reacted in the step (D).
<9> A method for producing an optical component, wherein the cured product of the episulfide-based resin obtained by the method according to any one of items <1> to <8> is subjected to cutting work.

According to the present invention, it is possible to produce a cured product of an episulfide-based resin having a large size and a high refractive index, including a thick lens such as a convex lens and a resin mass for an optical material to be subjected to cutting work, with yellowing and striae being suppressed. Regarding the size of the cured product of the episulfide-based resin (resin mass) obtained, for example, the thickness is 1 cm, 2 cm or 5 cm or more, and the volume is 50 cm³, 100 cm³ or 200 cm³ or more. According to the present invention, it is possible to obtain a cured product of an episulfide-based resin having a size such that a cuboid of 1 cm×5 cm×5 cm or 3 cm×3 cm×10 cm or 3 cm×14 cm×14 cm is included in the cured product.

Further, by subjecting the cured product of the episulfide-based resin to cutting work, an optical component having a desired size and shape can be obtained. Specifically, a thick lens having a thickness of 1 cm, 2 cm or 5 cm or more can be produced.

According to the present invention, it is possible to produce a thick resin mass having a length of the short side of 1 cm, 2 cm or 5 cm or more. Further, by subjecting the cured product of the episulfide-based resin to cutting work, a transparent substrate, a transparent film, a spectacle lens, a lens, a prism, a mirror, a beam splitter, a filter and other optical members, with a desired size and shape, can be produced.

DETAILED DESCRIPTION OF THE PREFERRED EMBODIMENTS

The present invention relates to a method for producing a cured product of an episulfide-based resin, the method sequentially having:
(A) a step of obtaining a resin composition by mixing a compound (a) below, a compound (b) below and a polymerization catalyst;
(B) a step of injecting the resin composition into a mold; and
(C) a step of polymerizing the resin composition in a heating medium, which contains a liquid having a thermal conductivity of 0.2 W/m·K or higher, or in a shower of the heating medium, with the temperature of the heating medium being elevated, wherein the maximum temperature of the heating medium in the step (C) is 55 to 110° C., and a method for producing an optical component by subjecting the cured product of the episulfide-based resin to cutting work.
(a) a compound having two episulfide groups per molecule represented by formula (1) below:

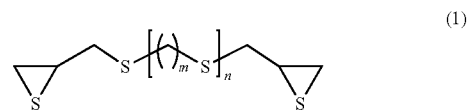

(1)

wherein m represents an integer from 0 to 4 and n represents an integer from 0 to 2
(b) a compound having at least one thiol group in one molecule The compound (a) of the present invention is a compound having two intramolecular episulfide groups represented by the above-described formula (1), and specific examples thereof include at least one episulfide compound selected from the group consisting of bis(β-epithiopropyl)sulfide, bis(β-epithiopropyl)disulfide, bis(β-epithiopropyl)trisulfide, bis(β-epithiopropylthio)methane, 1,2-bis(β-epithiopropylthio)ethane, 1,3-bis(β-epithiopropylthio)propane, 1,2-bis(β-epithiopropylthio)propane, 1,4-bis(β-epithiopropylthio)butane and bis(β-epithiopropylthioethyl)sulfide.

Among them, specific preferred examples are bis(β-epithiopropyl)sulfide represented by the below-described formula and bis(β-epithiopropyl)disulfide represented by the below-described formula, and bis(β-epithiopropyl)sulfide is most preferred:

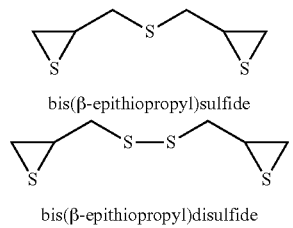

bis(β-epithiopropyl)sulfide bis(β-epithiopropyl)disulfide

The compound (b) of the present invention includes every compound having at least one thiol group in one molecule, and specific examples thereof include: aliphatic mercaptans such as methyl mercaptan, ethyl mercaptan, n-propyl mercaptan, n-butyl mercaptan, allyl mercaptan, n-hexyl mercaptan, n-octyl mercaptan, n-decyl mercaptan, n-dodecyl mercaptan, n-tetradecyl mercaptan, n-hexadecyl mercaptan, n-octadecyl mercaptan, cyclohexyl mercaptan, i-propyl mercaptan, t-butyl mercaptan, t-nonyl mercaptan, t-dodecyl mercaptan, phenyl mercaptan, benzyl mercaptan, 3-methylphenyl mercaptan, 4-methylphenyl mercaptan, 4-chlorobenzyl mercaptan, 4-vinylbenzyl mercaptan, 3-vinylbenzyl mercaptan, methyl mercaptopropionate, 2-mercaptoethanol, 3-mercapto-1,2-propanediol, 2-mercapto-1,3-propanediol, mercaptoacetic acid, mercaptoglycolic acid, mercaptopropionic acid, methanedithiol, 1,2-dimercaptoethane, 1,2-dimercaptopropane, 1,3-dimercaptopropane, 2,2-dimercaptopropane, 1,4-dimercaptobutane, 1,6-dimercaptohexane, bis(2-mercaptoethyl) ether, bis(2-mercaptoethyl) sulfide, 1,2-bis(2-mercaptoethyloxy)ethane, 1,2-bis(2-mercaptoethylthio)ethane, 2,3-dimercapto-1-propanol, 1,3-dimercapto-2-propanol, 1,2,3-trimercaptopropane, 2-mercaptomethyl-1,3-dimercaptopropane, 2-mercaptomethyl-1,4-dimercaptobutane, 2-(2-mercaptoethylthio)-1,3-dimercaptopropane, 4-mercaptomethyl-1,8-dimercapto-3,6-dithiaoctane, 2,4-dimercaptomethyl-1,5-dimercapto-3-thiapentane, 4,8-dimercaptomethyl-1,11-dimercapto-3,6,9-trithiaundecane, 4,7-dimercaptomethyl-1,11-dimercapto-3,6,9-trithiaundecane, 5,7-dimercaptomethyl-1,11-dimercapto-3,6,9-trithiaundecane, 1,1,1-tris(mercaptomethyl)propane, tetrakis(mercaptomethyl)methane, ethylene glycol bis(2-mercaptoacetate), ethylene glycol bis(3-mercaptopropionate), diethylene glycol bis(2-mercaptoacetate), diethylene glycol bis(3-mercaptopropionate), 1,4-butanediol bis(2-mercaptoacetate), 1,4-butanediol bis(3-mercaptopropionate), trimethylolpropane tris(2-mercaptoacetate), trimethylolpropane tris(3-mercaptopropionate), trimethylolpropane tris(3-mercaptobutyrate), pentaerythritol tetrakis(2-mercaptoacetate), pentaerythritol tetrakis(3-mercaptopropionate), pentaerythritol tetrakis(3-mercaptobutyrate), 1,2-dimercaptocyclohexane, 1,3-dimercaptocyclohexane, 1,4-dimercaptocyclohexane, 1,3-bis(mercaptomethyl)cyclohexane, 1,4-bis(mercaptomethyl)cyclohexane, 2,5-bis(mercaptomethyl)-1,4-dithiane, 2,5-bis(2-mercaptoethyl)-1,4-dithiane, 2,5-bis(2-mercaptoethylthiomethyl)-1,4-dithiane, 2,5-bis(mercaptomethyl)-1-thiane, 2,5-bis(2-mercaptoethyl)-1-thiane, 2,5-bis(mercaptomethyl)thiophene, 1,2-epithiomercaptoethane, 1,2-epithio-1,2-dimercaptoethane, 1,2-epithio-1,2,3,4-tetramercaptoethane, 1,2-epithio-3-mercaptopropane, 1,2-epithio-3,3-dimercaptopropane, 1,2-epithio-3,3,3-trimercaptopropane, 2,3-epithio-1,4-dimercaptobutane, 2,3-epithio-1,1,4,4-tetramercaptobutane, 1,2-epithio-5-mercapto-4-thiapentane, 1,2-epithio-5,5-dimercapto-4-thiapentane, 1,2-epithio-5,5,5-trimercapto-4-thiapentane, 1,2:6,7-diepithio-1,7-dimercapto-5-thiaheptane and 1,2:6,7-diepithio-3,5-dimercapto-5-thiaheptane; and aromatic cyclic mercaptans such as 1,2-dimercaptobenzene, 1,3-dimercaptobenzene, 1,4-dimercaptobenzene, o-xylylenedithiol, m-xylylenedithiol, p-xylylenedithiol, 2,2'-dimercaptobiphenyl, 4,4'-dimercaptobiphenyl, bis(4-mercaptophenyl)methane, 2,2-bis(4-mercaptophenyl)propane, bis(4-mercaptophenyl)ether, bis(4-mercaptophenyl)sulfide, bis(4-mercaptophenyl)sulfone, bis(4-mercaptomethylphenyl)methane, 2,2-bis(4-mercaptomethylphenyl)propane, bis(4-mercaptomethylphenyl)ether, bis(4-mercaptomethylphenyl)sulfide, 4-hydroxythiophenol and mercaptobenzoic acid. In addition, thiols such as sulfide oligomers and disulfide oligomers which are dimers to icosamers of these thiol compounds are also included.

The compound (b) of the present invention is not limited to the above-described compounds, and these compounds may be used solely, or two or more of them may be used in combination. Among them, preferred is a compound having at least two mercapto groups in one molecule, and more preferred are bis(2-mercaptoethyl)sulfide, 2,5-bis(mercaptomethyl)-1,4-dithiane, m-xylylenedithiol, 4-mercaptomethyl-1,8-dimercapto-3,6-dithiaoctane, pentaerythritol tetrakis(2-mercaptoacetate), pentaerythritol tetrakis(3-mercaptopropionate) and pentaerythritol tetrakis(3-mercaptobutyrate).

The ratio of the compound (a) in the resin composition of the present invention is usually 25% by mass or more, preferably 30% by mass or more, and more preferably 32.5% by mass or more. The ratio of the compound (b) in the resin composition of the present invention is usually 0.5% by mass or more, preferably 1% by mass or more, and more preferably 2.5% by mass or more. Further, the ratio of the total of the compound (a) and the compound (b) in the resin composition of the present invention is usually 25.5% by mass or more, preferably 31% by mass or more, and more preferably 35% by mass or more.

The ratio between the compound (a) and the compound (b) in the resin composition of the present invention cannot be determined categorically because physical properties such as optical characteristics, strength and heat resistance and the like of a resin-cured product obtained vary depending on the types of the respective compounds. However, the amount of the compound (b) is usually 50 to 1 parts by weight per 50 to 99 parts by weight of the compound (a), preferably 40 to 2 parts by weight per 60 to 98 parts by weight of the compound (a), and more preferably 35 to 5 parts by weight per 65 to 95 parts by weight of the compound (a). When the amount of the compound (a) is less than 50 parts by weight, the heat resistance may be reduced, and when the amount is more than 99 parts by weight, the light resistance of the resin-cured product may be significantly reduced.

In addition, regarding the ratio between the episulfide group of the compound (a) and the SH group of the compound (b), preferably, SH group/episulfide group=0.01 to 0.5, more preferably, SH group/episulfide group=0.01 to 0.3, and even more preferably, SH group/episulfide group=0.01 to 0.2. When the ratio is less than 0.01, the yellowness and light resistance of the cured product may be deteriorated, and when the ratio is more than 0.5, the heat resistance may be reduced.

In the present invention, the polymerization catalyst to be added for polymerization and curing of the compounds (a) and (b) is not particularly limited as long as it exerts polymerization and curing, and examples thereof include amines, phosphines, quaternary ammonium salts and quaternary phosphonium salts.

Such polymerization catalysts may be used solely, or two or more of them may be used in combination. Specific preferred examples thereof include quaternary ammonium salts such as tetra-n-butylammonium bromide, triethylbenzyl ammonium chloride, cetyldimethylbenzyl ammonium chloride and 1-n-dodecyl pyridinium chloride and quaternary phosphonium salts such as tetra-n-butylphosphonium bromide and tetraphenyl phosphonium bromide. Among them, specific more preferred examples are triethylbenzyl ammonium chloride and tetra-n-butylphosphonium bromide.

The amount of the polymerization catalyst to be added is 0.001 to 5 parts by weight, preferably 0.002 to 5 parts by weight, and more preferably 0.005 to 3 parts by weight when the total amount of the compounds (a) and (b) is 100 parts by weight.

At the time of polymerization and curing, to the resin composition of the present invention containing the compounds (a) and (b) and the polymerization catalyst, a polymerization modifier may be added according to need for the purpose of extension of the pot life, dispersion of heat generated by the polymerization, etc. Examples of the polymerization modifier include halides of silicon, germanium, tin and antimony. Preferred are chlorides of silicon, germanium, tin and antimony, and more preferred are chlorides of germanium, tin and antimony, which have an alkyl group. Specifically, dibutyltin dichloride, butyltin trichloride, dioctyltin dichloride, octyltin trichloride, dibutyldichlorogermanium, butyltrichlorogermanium, diphenyldichlorogermanium, phenyltrichlorogermanium and triphenylantimony dichloride are most preferred. These polymerization modifiers may be used solely, or two or more of them may be used in combination.

The amount of the polymerization modifier to be added is 0.001 to 5 parts by weight, preferably 0.002 to 5 parts by weight, and more preferably 0.005 to 3 parts by weight when the total amount of the compounds (a) and (b) is 100 parts by weight.

In the resin composition of the present invention containing the compounds (a) and (b) and the polymerization catalyst, it is surely possible to add publicly-known additives such as an antioxidant, a blueing agent, an ultraviolet absorber and a deodorizer, and a compound other than the compounds (a) and (b) which can be reacted with the compound (a) and/or the compound (b), as optional components, according to need to further improve practicability of the material obtained. Further, when the resin-cured product of the present invention is easily released from the mold during polymerization, a publicly-known external and/or internal adhesiveness improving agent can be applied to the mold made of glass or metal to be used for polymerization and curing or added to the resin composition, and when the resin-cured product is not easily released from the mold, a publicly-known external and/or internal mold release improving agent can be applied to the mold made of glass or metal to be used for polymerization and curing or added to the resin composition. It is effective to apply or add such an agent to improve adhesiveness or mold release characteristics between the resin-cured product obtained and the mold.

In the present invention, the mold into which the resin composition is injected at the time of polymerization and curing may be made of any material as long as the shape can be held to some extent, and examples of the material include metal, glass, resin and paper. The mold can be made by combining two or more of such materials.

Hereinafter, the method for producing a cured product of an episulfide-based resin of the present invention will be specifically described.

The step (A) of obtaining a resin composition by mixing compounds (a) and (b) and a polymerization catalyst is a step of obtaining a resin composition comprising at least the compounds (a) and (b) and the polymerization catalyst by stirring and mixing at least the compounds (a) and (b) and the polymerization catalyst, and optionally a polymerization modifier and the optional components, at usually 0° C. to 45° C., preferably 5° C. to 40° C., and more preferably 10° C. to 40° C. In this regard, all the components may be mixed together simultaneously in the same container with stirring, or may be added and mixed in a stepwise fashion. Alternatively, respective several components may be separately mixed and then mixed again in the same container. Mixing may be performed in any atmosphere, for example, in the presence of a gas such as nitrogen, oxygen, hydrogen and hydrogen sulfide, in a sealed atmosphere under ordinary pressure or increased/reduced pressure, or under reduced pressure. It is preferred to perform mixing and deaeration under reduced pressure because it improves transparency of the resin-cured product obtained by polymerization and curing.

There is no limitation on the time required for the step of stirring and mixing for obtaining the resin composition, but the time is usually 0 to 24 hours, preferably 0 to 12 hours, and more preferably 0.5 to 6 hours. Meanwhile, by performing a preliminary reaction in the step of stirring and mixing, a cured product of an episulfide-based resin having a large size suitable for optical components can be more easily obtained in the next polymerization step. Specifically, in the early process of the polymerization reaction, the amount of heat generated is large and it is difficult to perform heat removal, but by performing heat removal with efficient heat conduction in the step of stirring, in the next step, polymerization after injection into the mold can be more easily controlled. In this regard, the reaction rate of the compound of formula (1) is 0 to 15%, and more preferably 0.1 to 10%. When the reaction rate is 15% or more, it becomes impossible to take out the composition from a stirring and mixing tank because the viscosity is increased more than required, and it is undesirable. Note that the reaction rate of the compound of formula (1) can be calculated from the area intensity of the peak on infrared absorption spectrum (IR) at 1385-1425 $cm^{-1}$ which is characteristic absorption of the cured product. As an IR apparatus, either an in-line IR apparatus or off-line IR apparatus may be used. Further, the reaction rate at the early stage of the reaction can also be measured by GPC analysis.

In the step (B) of injecting the resin composition into a mold, the resin composition obtained in the aforementioned step is injected into the mold, but the step (B) is not particularly limited as long as a method in which air bubbles are not mixed in the resin composition is employed. In addition, it is preferred to filter impurities and the like from the resin composition to be purified using a filter in each step prior to injection into the mold and/or at the time of injection for further improving the quality of the resin-cured product of the present invention. The pore diameter of the filter to be used herein is usually 0.05 to 10 μm, and generally 0.1 to 5.0 μm. The material of the filter is preferably PTFE, PET, PP or the like. If filtration is not performed or filtration is performed using a filter having a pore diameter of more than 10 μm, foreign matters may be mixed in the resin-cured product or the transparency may be reduced, and therefore the obtained product usually cannot be used as the resin-cured product. After injection into the mold, defoaming under reduced pressure or centrifugal defoaming can be performed if necessary.

The polymerization step for polymerizing the resin composition is generally carried out in an oven. However, since the amount of heat generated by polymerization is large in the case of an episulfide compound such as the compound (a), when preparing a resin mass having a large size, it is important to efficiently remove generated heat to the outside of the system. Accordingly, in the method of the present invention, a heating medium comprising a liquid having a thermal conductivity higher than that of air is used as a heating medium. Specifically, the thermal conductivity is required to be 0.2 W/m·K or higher, and preferably 0.5 W/m·K or higher. The heating medium to be used in the present invention preferably consists of a liquid having a thermal conductivity of 0.2 W/m·K or higher. Further, regarding the boiling point of the heating medium, it is necessary that the boiling point is at least a temperature required for polymerization of the resin composition. The boiling point is preferably 60° C. or higher, and more preferably 95° C. or higher. Further, the temperature of the heating medium may become higher than a desirable controlled temperature due to heat generated by polymerization.

This overheat may cause yellowing of the cured product, and in some cases, rapid polymerization to cause a decomposition reaction of the composition. For this reason, in order to prevent increase of the temperature of the heating medium to an undesirable high temperature, the boiling point of the heating medium is preferably 120° C. or lower. Specific examples of the heating medium include water, an aqueous solution, ethylene glycol, diethylene glycol, glycerin and an ionic liquid, and two or more of such substances may be used in combination. Particularly preferred is water because of suitable thermal conductivity and boiling point as well as ease of handling and economic reasons. Usually, the thermal conductivity of water is 0.60 to 0.67 W/m·K, the thermal conductivity of ethylene glycol is 0.25 W/m·K, and the thermal conductivity of glycerin is 0.29 W/m·K.

The resin composition is polymerized by heating the resin composition in the heating medium filling a bath equipped with a heating and cooling apparatus, or in a shower of the heating medium. For improving efficiency of heat removal, an apparatus for stirring or circulating the heating medium may be used. In the polymerization process, it is preferred to undergo 2 stages, i.e., a step (D) of carrying out polymerization with a low temperature being kept (optional step), and subsequently a step (C) of carrying out polymerization with the temperature being elevated (essential step), to obtain a cured product of an episulfide-based resin appropriate for the present invention. The step (D) of carrying out polymerization with a low temperature being kept is not necessarily required, but it can more reliably suppress yellowing (coloring), striae and haze of a cured product of an episulfide-based resin obtained.

In the step (D) of carrying out polymerization with a low temperature being kept, it is preferred to carry out polymerization in a manner such that the reaction rate of the compound of formula (1) becomes 10 to 90%. The reaction rate is more preferably 10 to 80%, and even more preferably 20 to 70%. When the reaction rate is lower than 10%, the reaction time becomes longer and it is not appropriate as an industrial process, and in addition, in the next step of carrying out polymerization with the temperature being elevated, it may be impossible to control heat generation, resulting in coloring. Meanwhile, when the reaction rate is higher than 90%, it is required to keep a low temperature for a long period of time, and haze tends to easily occur. In the step (D) of carrying out polymerization with a low temperature being kept, the temperature of the heating medium is preferably 0 to 55° C., more preferably 5 to 50° C., and particularly preferably 10 to 40° C. When the temperature of the heating medium is higher than that, it may result in rapid polymerization and heat cannot be completely removed, and it may cause yellowing or decomposition reaction of the cured product. When the temperature is lower than that, the reaction of the compound of formula (1) does not progress enough, and in the next step of carrying out polymerization with the temperature being elevated, it may result in rapid polymerization to cause yellowing or decomposition reaction.

After the step (D) of carrying out polymerization with a low temperature being kept (optional step), the step (C) in which the temperature is elevated is undergone. In the step (C) of carrying out polymerization with the temperature being elevated, it is preferred to carry out polymerization in a manner such that the reaction rate of the compound of formula (1) becomes 95 to 100%. When the reaction rate is lower than 95%, curing may be insufficiently carried out to cause a reduction in the glass transition temperature. In the step (C) of carrying out polymerization with the temperature being elevated, the maximum temperature of the heating medium is 55 to 110° C., preferably 55 to 95° C., and more preferably 70 to 90° C. When the maximum temperature of the heating medium is lower than 55° C., the reaction extent does not increase enough. Meanwhile, when the maximum temperature is higher than 110° C., heat generated by polymerization cannot be completely removed and the temperature of the resin composition sharply increases, and it may cause yellowing of a resin-cured product obtained, and in some cases, it may result in rapid polymerization to cause a decomposition reaction of the resin composition.

In the polymerization process, decrease of the volume in the mold due to polymerization shrinkage of the resin composition may deteriorate transferability of the mold. Therefore, the inside of the mold is set to be an open system, not a closed system, thereby improving transferability. Specifically, an opening can be provided to a portion of the mold for controlling the pressure therein to be equal to the external pressure. Alternatively, a deformable container, tank or the like filled with a gas for pressure adjustment can be attached to the mold. Examples of the deformable container include a rubber balloon and resin film bags such as a polyethylene film bag, a polyvinyl fluoride (vinyl fluoride) film bag and a PET film bag. More preferably, because of ease of handling and economic reasons, an opening is provided to a portion of the mold for controlling the pressure therein to be equal to the external pressure.

Regarding the cured product of the episulfide-based resin obtained in the polymerization process, when it is obtained by injection into a mold having a desired shape, it may be directly used as an optical component. Meanwhile, after taken out from the mold, the obtained product may be subjected to cutting work to obtain a desired shape. Examples of cutting work include cut-out processing by means of a wire saw, blade saw or the like and polishing. Equipments and techniques for cut-out processing are not particularly limited. Further, equipments and techniques for polishing are not limited, but it is required to use an equipment and technique appropriate for desired surface roughness accuracy. Before or after cutting and polishing, the resin-cured product may be annealed. This is effective for correcting the shape of the resin deformed due to processing stress at the stage of cutting work. The temperature for annealing is preferably a temperature around the glass transition temperature of the resin, specifically 70° C. to 120° C. When the temperature is lower than that, the effect of annealing is insufficient and the deformed shape is not corrected. When the temperature is higher than that, undesirable influences such as discoloration of the resin may be caused. The annealing time is preferably 0 to 3 hours. When the time is within this range, the deformed shape can be sufficiently corrected.

Through these steps of cutting work, a transparent substrate, a transparent film, a spectacle lens, a lens, a prism, a mirror, a beam splitter, a filter and other optical components can be produced.

EXAMPLES

Hereinafter, the present invention will be specifically described by way of working examples, but the present invention is not limited thereto. As an oven, a small environmental test equipment SU-221 manufactured by ESPEC CORP. was used. Regarding the reaction rate of the compound of formula (1), the measurement was carried out with in-line IR, and the reaction extent was calculated from the peak area intensity of 1385 to 1425 cm$^{-1}$, which is a characteristic absorption, based on the following formula:

[Reaction rate]=([peak area intensity of 1385 to 1425 cm$^{-1}$ at a predetermined point of time of reaction]/[peak area intensity of 1385 to 1425 cm$^{-1}$ of cured product])×100(%)

As a rotary blade cutting machine, Labo Cutter MC-120 manufactured by Maruto Instrument Co., Ltd. was used. For rough cutting of lenses, VFT-Orbit manufactured by Satislor was used. For lapping and polishing of lenses, TORO-X-25L manufactured by Satislor was used. For wire saw cutting, MWM442DM manufactured by Komatsu NTC Ltd. was used. For surface polishing, a polishing machine 16BN manufactured by Hamai Co., Ltd. was used. For in-line IR, ReactIR45m manufactured by Mettler-Toledo International Inc. was used.

Example 1

225 g of bis(β-epithiopropyl)sulfide as the compound (a), 25 g of bis(2-mercaptoethyl) sulfide as the compound (b) and 0.25 g of tetra-n-butylphosphonium bromide as the polymerization catalyst were mixed together with stirring at 20° C. for 1 hour to obtain a homogeneous solution. Next, this was filtered using a PTFE filter of 0.5 μm and injected into a mold consisting of 2 glass molds for flat lenses (φ: 83 mm) and a resin gasket having a thickness of 30 mm, and the temperature thereof was elevated from 20° C. to 80° C. over 72 hours in water bath (thermal conductivity of water: 0.60 to 0.67 W/m·K (20 to 80° C.), boiling point: 100° C.) with the temperature raising rate being controlled to be constant to carry out polymerization and curing, thereby producing a resin-cured product. The obtained resin-cured product was colorless and transparent, and striae were not generated.

Example 2

Polymerization and curing was carried out in a manner similar to that in Example 1, except that an adhesive tape was used instead of a resin gasket having a thickness of 30 mm to provide a mold in which the thickness between 2 glass molds for flat lenses (φ: 83 mm) was set to be 10 mm, thereby producing a resin-cured product. The obtained resin-cured product was colorless and transparent, and striae were not generated.

Example 3

Polymerization and curing was carried out in a manner similar to that in Example 1, except that ethylene glycol bath (thermal conductivity: 0.25 W/m·K, boiling point: 197° C.) was used instead of water bath, thereby producing a resin-cured product. The obtained resin-cured product was colorless and transparent, and striae were not generated.

Comparative Example 1 (Use of Oven)

Polymerization and curing was tried to be carried out in a manner similar to that in Example 1, except that an oven (thermal conductivity of air: 0.02 W/m·K) was used instead of water bath. The resin composition was reddened due to rapid polymerization, and it was impossible to obtain a normal resin-cured product.

Comparative Example 2 (Use of Oven)

Polymerization and curing was carried out in a manner similar to that in Example 2, except that an oven was used instead of water bath, thereby producing a resin-cured product. The obtained resin-cured product was colorless and transparent, but many striae were generated.

Example 4

225 g of bis(β-epithiopropyl)sulfide as the compound (a), 25 g of bis(2-mercaptoethyl) sulfide as the compound (b) and 0.25 g of tetra-n-butylphosphonium bromide as the polymerization catalyst were mixed together with stirring at 20° C. for 1 hour to obtain a homogeneous solution. Next, this was filtered using a PTFE filter of 0.5 μm and injected into a polypropylene container having an inner diameter of 5 cm and a height of 10 cm, and the container was sealed hermetically with a polypropylene screw cap. The temperature thereof was elevated from 20° C. to 80° C. over 72 hours in water bath with the temperature raising rate being controlled to be constant to carry out polymerization and curing, thereby producing a resin-cured product. The obtained resin-cured product was colorless and transparent, and striae were not generated. There were just a few peeling traces of the resin-cured product in the polypropylene container.

Example 5

Polymerization and curing was carried out in a manner similar to that in Example 4, except that a hole (φ: 1 mm) was made in the upper portion of the polypropylene container to keep the pressure in the void portion in the container to be equal to the external pressure, thereby producing a resin-cured product. The obtained resin-cured product was colorless and transparent, and striae were not generated. In addition, it was excellent in transferability of the shape of the polypropylene container.

Comparative Example 3 (Use of Oven)

Polymerization and curing was tried to be carried out in a manner similar to that in Example 4, except that an oven was used instead of water bath. The resin composition was reddened due to rapid polymerization, and it was impossible to obtain a normal resin-cured product.

Comparative Example 4 (Use of Silicone Oil Bath)

Polymerization and curing was tried to be carried out in a manner similar to that in Example 4, except that silicone oil bath (KF-54 manufactured by Shin-Etsu Chemical Co., Ltd., thermal conductivity: 0.13 W/m·K) was used instead of water bath. The resin composition was reddened due to rapid polymerization, and it was impossible to obtain a normal resin-cured product.

Comparative Example 5 (Difference of Maximum Achieving Temperature of Bath)

Polymerization and curing was tried to be carried out in a manner similar to that in Example 4, except that ethylene glycol bath was used instead of water bath and the temperature was elevated from 20° C. to 120° C. over 120 hours with the temperature raising rate being controlled to be constant, instead of elevating the temperature from 20° C. to 80° C. over 72 hours. The obtained resin-cured product was yellowed.

Example 6

225 g of bis(β-epithiopropyl)sulfide as the compound (a), 25 g of bis(2-mercaptoethyl) sulfide as the compound (b)

and 0.18 g of tetra-n-butylphosphonium bromide as the polymerization catalyst were mixed together with stirring at 20° C. for 1 hour to obtain a homogeneous solution. Next, this was filtered using a PTFE filter of 0.5 μm and injected into a polypropylene container having an inner diameter of 5 cm and a height of 10 cm, and the container was sealed hermetically with a polypropylene screw cap. In water bath, the temperature was held constant at 30° C. for 24 hours, and then elevated to 80° C. over 48 hours at a constant temperature raising rate to carry out polymerization and curing, thereby producing a resin-cured product. The obtained resin-cured product was colorless and transparent, and striae were not generated.

Example 7

225 g of bis(β-epithiopropyl)sulfide as the compound (a), 25 g of bis(2-mercaptoethyl) sulfide as the compound (b), 0.25 g of tetra-n-butylphosphonium bromide as the polymerization catalyst and 0.1 g of di-n-butyltin dichloride as the polymerization modifier were mixed together with stirring at 20° C. to obtain a homogeneous solution. Next, this was filtered using a PTFE filter of 0.5 μm and injected into a polypropylene container having an inner diameter of 5 cm and a height of 10 cm, and the container was sealed hermetically with a polypropylene screw cap. In water bath, the temperature was elevated from 40° C. to 80° C. over 72 hours at a constant temperature raising rate to carry out polymerization and curing, thereby producing a resin-cured product. The obtained resin-cured product was colorless and transparent, and striae were not generated. There were just a few peeling traces of the resin-cured product in the polypropylene container.

Comparative Example 6 (Use of Oven)

Polymerization and curing was tried to be carried out in a manner similar to that in Example 5, except that an oven was used instead of water bath. The resin composition was reddened due to rapid polymerization, and it was impossible to obtain a normal resin-cured product.

Example 8

225 g of bis(β-epithiopropyl)sulfide as the compound (a), 25 g of m-xylylenedithiol as the compound (b) and 0.25 g of tetra-n-butylphosphonium bromide as the polymerization catalyst were mixed together with stirring at 20° C. to obtain a homogeneous solution. Next, this was filtered using a PTFE filter of 0.5 μm and injected into a polypropylene container having an inner diameter of 5 cm and a height of 10 cm, and the container was sealed hermetically with a polypropylene screw cap. A constant temperature circulator was used, and the controlling water temperature of the constant temperature circulator was elevated from 20° C. to 80° C. over 72 hours with the temperature raising rate being controlled to be constant, while the container containing the resin composition was continuously subjected to a water shower, thereby producing a resin-cured product. The obtained resin-cured product was colorless and transparent, and striae were not generated. There were just a few peeling traces of the resin-cured product in the polypropylene container.

Example 9

900 g of bis(β-epithiopropyl)sulfide as the compound (a), 100 g of bis(2-mercaptoethyl) sulfide as the compound (b) and 1.00 g of tetra-n-butylphosphonium bromide as the polymerization catalyst were mixed together with stirring at 20° C. (1 hour) to obtain a homogeneous solution. Next, this was filtered using a PTFE filter of 0.5 μm and injected into a polypropylene container (height: 4 cm, width: 15 cm, depth: 15 cm), and the container was sealed hermetically with a screw cap. The temperature thereof was elevated from 20° C. to 80° C. over 72 hours in water bath with the temperature raising rate being controlled to be constant to carry out polymerization and curing, thereby producing a resin-cured product. The obtained resin-cured product was colorless and transparent, and striae were not generated.

Comparative Example 7 (difference of Maximum Achieving Temperature of Bath)

In a manner similar to that in Example 9, a solution was injected into a polypropylene container, and this was sealed hermetically with a screw cap. The temperature was kept at 20° C. for 10 hours, and then elevated to 120° C. over 24 hours with the temperature raising rate being controlled to be constant to carry out polymerization and curing, thereby producing a resin-cured product. The obtained resin-cured product was yellowed, and striae were generated.

Example 10

In a manner similar to that in Example 9, a solution was injected into a polypropylene container, and an in-line IR probe was inserted therein, and then the container was sealed hermetically with a screw cap. The temperature was kept at 20° C. for 10 hours, and then elevated to 80° C. over 48 hours with the temperature raising rate being controlled to be constant to carry out polymerization and curing, thereby producing a resin-cured product. The reaction rate at the stage of keeping the temperature at 20° C. for 10 hours was 10%. The obtained resin-cured product was colorless and transparent, and striae were not generated.

Example 11

In a manner similar to that in Example 9, a solution was injected into a polypropylene container, and an in-line IR probe was inserted therein, and then the container was sealed hermetically with a screw cap. The temperature was kept at 20° C. for 80 hours, and then elevated to 80° C. over 48 hours with the temperature raising rate being controlled to be constant to carry out polymerization and curing, thereby producing a resin-cured product. The reaction rate at the stage of keeping the temperature at 20° C. for 80 hours was 90%. The obtained resin-cured product was colorless and transparent, and striae were not generated.

Example 12

The resin-cured product obtained in Example 4 was cut by a rotary blade cutting machine to obtain a resin mass having a diameter of 5 cm and a thickness of 2 cm. This was fixed to a polishing apparatus using a low melting point alloy and a fixture, roughly cut into a lens shape, and then subjected to lapping and polishing, thereby obtaining a transparent lens.

Example 13

The resin-cured product obtained in Example 9 was cut by a wire saw to 20 substrates (height: 10 cm, width: 10 cm, thickness: 1 mm). The obtained substrates were put into an oven to be heated at 100° C. for 1 hour. The substrates after heating were subjected to surface polishing using a polishing apparatus to obtain smooth surfaces. The substrates after polishing were cut into a round shape having a diameter of 4.5 cm, and 4 transparent lenses were obtained from one transparent substrate.

Example 14

Polymerization and curing was carried out in a manner similar to that in Example 1, except that glycerin bath (thermal conductivity: 0.29 W/m·K, boiling point: 290° C.) was used instead of water bath, thereby producing a resin-cured product. The obtained resin-cured product was colorless and transparent, and striae were not generated.

The invention claimed is:

1. A method for producing a cured product of an episulfide-based resin as an optical product, the cured product having a thickness of 1 cm or more, the method sequentially having:
    (A) a step of obtaining a resin composition by mixing a compound (a) below, a compound (b) below and a polymerization catalyst:
        (a) a compound having two episulfide groups per molecule represented by formula (1) below:

(1)

wherein m represents an integer from 0 to 4 and n represents an integer from 0 to 2;
        (b) a compound having at least one thiol group in one molecule;
    (B) a step of injecting the resin composition into a mold for manufacturing the cured product of the episulfide-based resin having a thickness of 1 cm or more; and
    (C) a step of polymerizing the resin composition in a heating medium, which comprises a liquid having a thermal conductivity of 0.2 W/m·K or higher, or in a shower of the heating medium, with the temperature of the heating medium being elevated,
    wherein the maximum temperature of the heating medium in the step (C) is 55 to 95° C.,
    wherein the size of the cured product of the episulfide-based resin is such that the volume is 50 cm³ or more and that a cuboid of 1 cm×5 cm×5 cm or 3 cm×3 cm×10 cm is included in the cured product.

2. The method according to claim 1, wherein the heating medium has a thermal conductivity of 0.5 W/m·K or higher.

3. The method according to claim 1, wherein the heating medium has a boiling point of 60° C. to 120° C.

4. The method according to claim 3, wherein the heating medium has a boiling point of 95° C. to 120° C.

5. The method according to claim 4, wherein the heating medium is water.

6. The method according to claim 1, which has, between the step (B) and the step (C), a step (D) of polymerizing the resin composition in the heating medium or in a shower of the heating medium with the temperature of the heating medium being kept at 0 to 55° C.

7. The method according to claim 6, wherein 10 to 90% of the compound represented by formula (1) is reacted in the step (D).

8. A method for producing an optical component, wherein the cured product of the episulfide-based resin obtained by the method according to claim 1 is subjected to cutting work.

9. The method according to claim 1, wherein the mold is for manufacturing the cured product of the episulfide-based resin having a thickness of 2 cm or more.

10. The method according to claim 1, wherein the maximum temperature of the heating medium in step (C) is 55 to 90° C.

11. A method for producing a cured product of an episulfide-based resin as an optical product, the cured product having a thickness of 2 cm or more, the method sequentially having:
    (A) a step of obtaining a resin composition by mixing a compound (a) below, a compound (b) below and a polymerization catalyst:
        (a) a compound having two episulfide groups per molecule represented by formula (1) below:

(1)

wherein m represents an integer from 0 to 4 and n represents an integer from 0 to 2;
        (b) a compound having at least one thiol group in one molecule;
    (B) a step of injecting the resin composition into a mold in such a manner as to produce a cured product having a thickness of 2 cm or more; and
    (C) a step of polymerizing the resin composition in a heating medium, which comprises a liquid having a thermal conductivity of 0.2 W/m·K or higher, or in a shower of the heating medium, with the temperature of the heating medium being elevated,
    wherein the maximum temperature of the heating medium in the step (C) is 55 to 110° C., wherein the size of the cured product of the episulfide-based resin is such that the volume is 50 cm³ or more and that a cuboid of 1 cm×5 cm×5 cm or 3 cm×3 cm×10 cm is included in the cured product and
    wherein the amount of compound (b) is 50 to 1 parts by weight per 50 to 99 parts by weight of compound (a).

* * * * *